US008824498B2

(12) United States Patent
Chen et al.

(10) Patent No.: US 8,824,498 B2

(45) Date of Patent: Sep. 2, 2014

(54) METHOD AND APPARATUS FOR TRANSMITTING MULTIPLE SERVICES

(75) Inventors: Zhiyun Chen, Chengdu (CN); Xing Hu, Shenzhen (CN); Min Yan, Chengdu (CN); Jianlin Zhou, Shenzhen (CN); Yang Cao, Shenzhen (CN); Kun Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 317 days.

(21) Appl. No.: 13/468,807

(22) Filed: May 10, 2012

(65) Prior Publication Data

US 2012/0224858 A1 Sep. 6, 2012

Related U.S. Application Data

(63) Continuation of application No. PCT/CN2010/078467, filed on Nov. 5, 2010.

(30) Foreign Application Priority Data

Nov. 10, 2009 (CN) .......................... 2009 1 0210795

(51) Int. Cl.
*H04L 12/43* (2006.01)
*H04Q 11/00* (2006.01)

(52) U.S. Cl.
CPC ... *H04Q 11/0067* (2013.01); *H04Q 2011/0092* (2013.01); *H04J 2203/0067* (2013.01); *H04Q 2011/0064* (2013.01)
USPC .......................................................... 370/458

(58) Field of Classification Search
CPC ................ H04J 2203/0067; H04J 2203/0091; H04J 3/1664; H04J 3/1682; H04J 2203/0069; H04L 45/125
USPC .......................... 370/235, 353, 458, 468, 401
See application file for complete search history.

(56) References Cited

U.S. PATENT DOCUMENTS 6,594,279 B1 * 7/2003 Nguyen et al. ................ 370/468
7,239,650 B2 * 7/2007 Rakib et al. ................... 370/480

(Continued)

FOREIGN PATENT DOCUMENTS

CN 1521988 A 8/2004
CN 101159751 4/2008

(Continued)

OTHER PUBLICATIONS

Written Opinion dated Feb. 10, 2011 in connection with International Patent Application No. PCT/CN2010/078467, 3 pages.

(Continued)

*Primary Examiner* — Raj Jain

(57) ABSTRACT

A method and an apparatus for transmitting multiple services are provided, and which belong to the field of optical transmission technologies. The method includes: receiving bandwidth information of TCONTs of all nodes; dividing a payload area of a GTH frame into a preset number n of arrays, where each array includes a specified number of timeslots and the interval between any two neighboring timeslots in each array is n and n is a natural number; calculating, according to the bandwidth information of the TCONTs of all the nodes, timeslot positions of arrays occupied by the TCONTs of each node in the payload area; interleaving, according to the timeslot positions of the arrays occupied by the TCONTs of a local node in the payload area, the TCONTs of the local node into corresponding timeslots starting from a specified frame, obtaining a GTH frame, and transmitting the GTH frame.

10 Claims, 13 Drawing Sheets

(56) References Cited

U.S. PATENT DOCUMENTS

| | | | | |
|---|---|---|---|---|
| 8,411,708 | B2 * | 4/2013 | Chiang et al. | 370/543 |
| 2009/0274463 | A1 | 11/2009 | Bernard et al. | |
| 2010/0080244 | A1 * | 4/2010 | Staehling et al. | 370/468 |
| 2010/0142550 | A1 | 6/2010 | Zhang | |

FOREIGN PATENT DOCUMENTS

| | | | |
|---|---|---|---|
| CN | 101232326 | A | 7/2008 |
| CN | 101252789 | A | 8/2008 |
| CN | 101465714 | A | 6/2009 |
| EP | 2 111 055 | A1 | 10/2009 |
| WO | WO 2007/051488 | A1 | 5/2007 |
| WO | WO 2009/069880 | A1 | 6/2009 |
| WO | WO 2009/124476 | A1 | 10/2009 |

OTHER PUBLICATIONS

International Search Report dated Feb. 10, 2011 in connection with International Patent Application No. PCT/CN2010/078467.

Search Report dated Dec. 13, 2012 in connection with Chinese Patent Application No. 2009102107958.

Supplementary European Search Report dated May 6, 2013 in connection with European Patent Application No. EP 10 82 9509.

* cited by examiner

METHOD AND APPARATUS FOR TRANSMITTING MULTIPLE SERVICES

CROSS-REFERENCE TO RELATED APPLICATIONS

This application is a continuation of International Application No. PCT/CN2010/078467, filed on Nov. 5, 2010, which claims priority to Chinese Patent Application No. 200910210795.8, filed on Nov. 10, 2009, both of which are hereby incorporated by reference in their entireties.

TECHNICAL FIELD

The present invention relates to the field of optical transmission technologies, and in particular, to a method and an apparatus for transmitting multiple services.

BACKGROUND

Current networks bear multiple services, such as voice, video, online gaming, and Web browsing. In recent years, a lot of large telecom operators choose the GPON (Gigabit Passive Optical Network, gigabit passive optical network) as a solution as future large bandwidth optical access, thereby imposing higher requirements upon metropolitan area network devices, that is, requiring these MAN devices to be able to interconnect with the GPON. With the use of large-capacity optical digital communication transmission systems and the introduction of various new services, communication networks become more complex and have larger capacity. This requires the metropolitan area network devices to support TDM (Time Division Multiplexing) services and multiple type data interfaces according to features such as diversified data service types and uncertain traffic.

In the prior art, a method for transmitting multiple services based on dynamic bandwidth adjustment is provided, and mainly applied on a ring network. On a ring network, the nodes are classified into N nodes and S nodes. The N node refers to a normal discrete service access node, and the S node, also called the master node, has the functions of the N node and can interconnect with upper-layer networks. Any node can directly add and drop conventional services such as TDM and Ethernet data services, and can also provide PON (Passive Optical Network, passive optical network) branch interfaces. The S node provides 10 GE (Gigabit Ethernet, gigabit Ethernet) uplink service interfaces. The services borne on the ring network includes three type: (1) fixed bandwidth services, referred to as FB (Fixed Bandwidth), mainly used to bear services with assured bandwidth and delay, for example, TDM, SDH (Synchronous Digital Hierarchy, synchronous digital hierarchy)/SONET (Synchronous Optical Network, synchronous optical network), and private line services; (2) assured bandwidth services, referred to as AB (Assured Bandwidth) services, for example, video, VoIP (Voice Over Internet Protocol, voice over Internet Protocol), and private line services; (3) best effort services, referred to BE (Best Effort) services, for example, ordinary Internet access services. For the AB and BE services, the network is a convergence network. The convergence node is the S node, and the node implements dual backup. For the FB services, the network is a peer-to-peer switching network on which TDM, SDH/SONET, and private line services can be added or dropped at any node.

The network includes three layers: a service adaptation layer, a channel layer, and a physical layer, the architecture is simple, the circuit processing is simple, and the reliability is high. Therefore, the cost is saved, and the power consumption is reduced, and the implement is easy. The service adaptation layer is responsible for encapsulating and decapsulating various services according to the format of an E-GEM (Enhanced GPON Encapsulation Method, enhanced GPON encapsulation method) frame and specifying a unique identifier for each service on the network. According to the principles such as service type, priority, and destination address, the channel layer adds channel overheads to multiple E-GEM frames to compose different types of T-CONT (Transmission Container, transmission container) frames, that is, channel layer frames. In this way, the end-to-end alarm and transmission performance monitoring can be implemented at the channel layer. The physical layer combines all the T-CONT frames into a TC (Transmission Convergence, transmission convergence) frame, that is, a physical layer frame, and adds physical layer overheads, including frame header synchronization, management overheads and a bandwidth map, to the TC frame to form a GTH (Generic Transport Hierarchy, generic transport hierarch) frame. In this way, the master node on the network can manage and communicate with each N node, so that it convenient to adjust the allocated timeslots of each TCONT, and dynamic bandwidth adjustment is implemented.

The process of implementing DEA (Dynamic Bandwidth Assignment, dynamic bandwidth assignment) by the network is as follows. Each N node detects, and take statistics on the DBR (Dynamic Bandwidth Requirement, dynamic bandwidth requirement) information of each service port on the node, and reports the DBR information to the master node; the master node performs judgment and calculation according to the current bandwidth resources on the ring, service types of each node, and priority, and delivers bandwidth assignment information of each node to each node; and each node transmits data according to the assigned bandwidth. The bandwidth assignment information refers to the BWmap (Bandwidth Map, bandwidth map). The size and number of T-CONT frames assembled by each node depends on the bandwidth map.

The prior art has at least following disadvantages.

If the bandwidth map of a working channel is the same as that of a protection channel, when any node sends services to the working channel and the protection channel respectively, delay may occur due to the alignment of the frame headers in both the channels. When the bandwidth map of the working channel is different from that of the protection channel, services can only be sent to the working channel and cannot be sent to the protection channel because the time sequence of the working channel is different from that of the protection channel.

As a result, the dual-transmission process fails. When lines of different rates are multiplexed, the time sequences cannot be aligned due to the mismatch of rates. In this case, services on low-rate lines can be mapped to high-rate lines only after being cached for a certain period of time, which causes delay and cache problems. For the FB services, due to the feature of a constant time sequence, after one or some TC frames are deleted, bandwidth map fragments may occur. Consequently, DBA dynamic assignment on the bandwidth map fragments is complex, and is difficult to be implemented.

SUMMARY

To overcome the defects of the prior art, embodiments of the present invention provide a method and an apparatus for transmitting multiple services. The technical solutions are as follows:

A method for transmitting multiple services includes:

receiving bandwidth information of transmission containers TCONTs of all nodes;

dividing a payload area of a generic transport hierarchy GTH frame into a preset number n of arrays, where each array includes a specified number of timeslots and the interval between any two neighboring timeslots in each array is n, where n is a natural number;

calculating, according to the bandwidth information of the TCONTs of all the nodes, timeslot positions of arrays occupied by the TCONTs of each node in the payload area; and interleaving, according to the timeslot positions of the arrays occupied by the TCONTs of a local node in the payload area, the TCONTs of the local node into corresponding timeslots starting from a specified frame, obtaining a GTH frame, and transmitting the GTH frame.

An apparatus for transmitting multiple services includes:

a receiving module, configured to receive bandwidth information of transmission containers TCONTs of all nodes;

a bandwidth information processing module, configured to: divide a payload area of a generic transport hierarchy GTH frame into a preset number n of arrays, where each array includes a specified number of timeslots and the interval between any two neighboring timeslots in each array is n, where n is a natural number, and calculate, according to the bandwidth information of the TCONTs of all the nodes, timeslot positions of arrays occupied by the TCONTs of each node in the payload area; and a frame processing module, configured to: interleave, according to the timeslot positions of arrays occupied by the TCONTs of a local node in the payload area, the TCONTs of the local node into corresponding timeslots starting from a specified frame, obtain a GTH frame, and transmit the GTH frame.

In the technical solutions provided in the embodiments of the present invention, timeslots are allocated evenly, so that asynchronous adaptation of multiple services can be implemented. In addition, bandwidth is strictly assured for different types of services, service bandwidth can be adjusted flexibly, and the logic implementation is simplified. Compared with the prior art, the technical solutions interleaves and multiplexes services by using timeslots instead of using the block TCONT structure, thereby greatly shortening the delay time occurring when a node sends services to a working channel and a protection channel respectively, reducing the cache size, and avoiding failure of the dual-transmission process. When lines of different rates are multiplexed, the cache size and delay needed for mapping services from low-rate lines to high-rate lines can be reduced. Furthermore, FB services can also be properly interleaved and multiplexed, and bandwidth fragments left after some FB services are deleted are fully utilized, thereby increasing the bandwidth utilization of the lines.

BRIEF DESCRIPTION OF THE DRAWINGS

To describe the technical solutions in embodiments of the present invention or in the prior art more clearly, the following outlines the accompanying drawings required in the description of the embodiments or the prior art. Apparently, the accompanying drawings illustrate only some exemplary embodiments of the present invention, and persons of ordinary skill in the art can derive other drawings from the accompanying drawings without creative efforts.

DETAILED DESCRIPTION

The technical solution provided in the embodiments of the present invention is hereinafter described clearly and completely with reference to the accompanying drawings. Apparently, the embodiments are only exemplary embodiments rather than all embodiments of the present invention. Persons of ordinary skill in the art can derive other embodiments based on the embodiments given herein without making any creative effort, and all such embodiments fall within the scope of the present invention.

In order to make the objectives, technical solutions, and merits of the present invention clearer, the embodiments of the present invention are hereinafter described in detail with reference to the accompanying drawings.

An embodiment of the present invention provides a method for transmitting multiple services, where the method includes:

receiving bandwidth information of TCONTs of all nodes;

dividing the payload area of a GTH frame into a preset number (n) of arrays, where each array includes a specified number of timeslots and the interval between any two neighboring timeslots in each array is n, where n is a natural number;

calculating, according to the bandwidth information of the TCONTs of all the nodes, the timeslot positions of arrays occupied by the TCONTs of each node in the payload area; and interleaving, according to the timeslot positions of arrays occupied by the TCONTs of a local node in the payload area, the TCONTs of the local node into corresponding timeslots starting from a specified frame, obtaining a GTH frame, and transmitting the GTH frame.

In the embodiment of the present invention, the master node refers to an S node on the network, the local node may be the S node or an N node, and the N node refers to a normal node. The TCONT is a control object of the bandwidth assignment, the master node may allocate one or multiple TCONTs for one N node, and the N node transmits services on the network by using the TCONT. Services involved in the embodiment of the present invention include, but are not limited to, the TDM service, the SDH/SONET/ATM service, and Ethernet data service. Specific services are not limited in the embodiment of the present invention. In the embodiment of the present invention, multiple types of services are involved, and include, but are not limited to: fixed bandwidth services, for example, the TDM service or data private line service; assured bandwidth services, for example, the video service; and best effect services, for example, the Internet access service.

Figure 1:
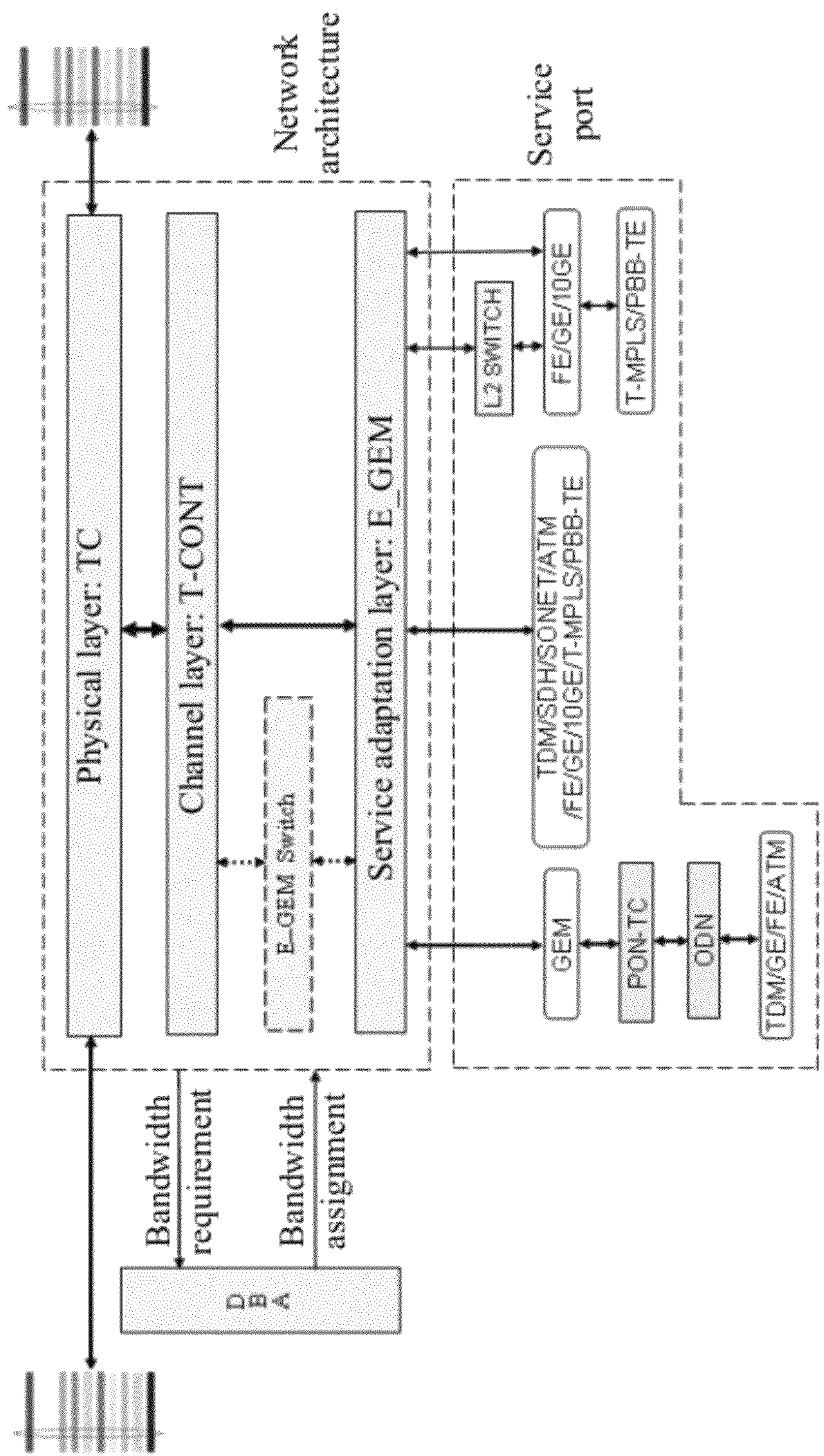
FIG. 1 is a schematic diagram of a network architecture for transmitting multiple services according to an embodiment of the present invention.

FIG. 1 illustrates a network architecture for transmitting multiple services according to an embodiment of the present invention. The network architecture of the network includes a physical layer, a channel layer, and a service adaptation layer. The physical layer, the channel layer, and the service adaptation layer correspond to a GTH frame, a TCONT frame, and an E-GEM frame respectively.

Figure 2:
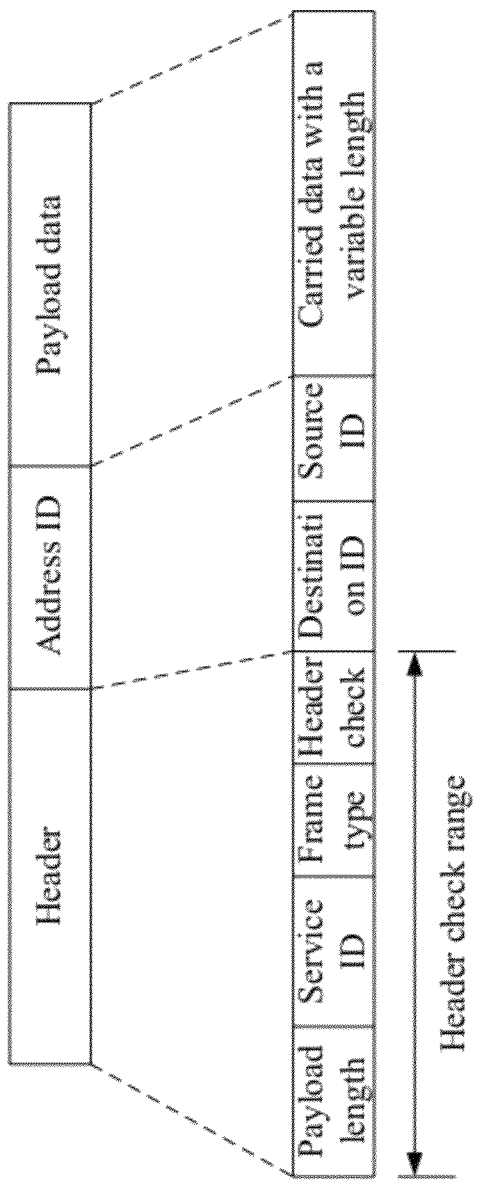
FIG. 2 is a schematic diagram of a format of an E-GEM frame according to an embodiment of the present invention.

As shown in FIG. 2, the format of the E-GEM frame includes three parts: a frame header, an address identity, and payload data. The frame header includes four fields: a payload length, a service ID, a frame type, and header check. The address identity includes a destination ID and a source ID.

Figure 3:
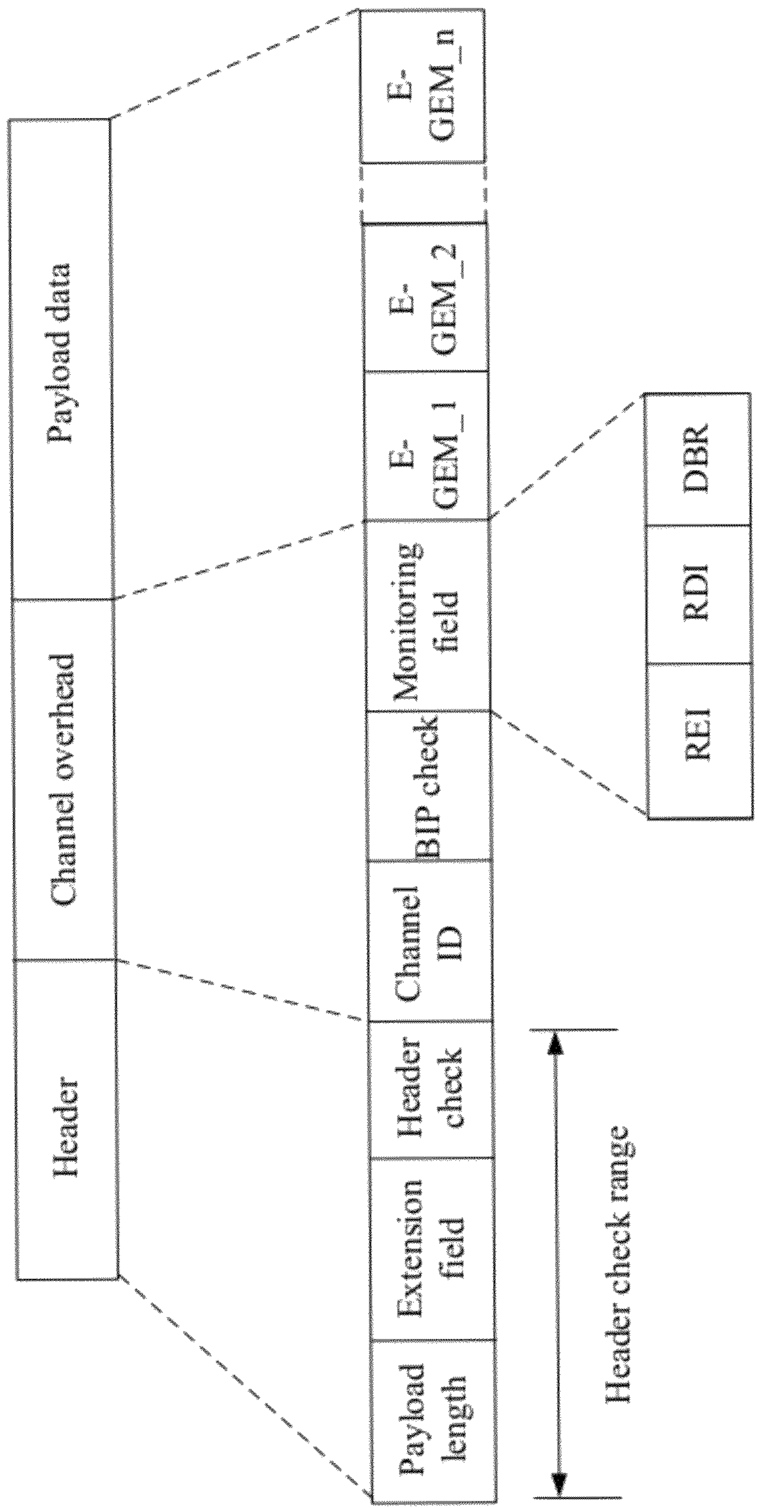
FIG. 3 is a schematic diagram of a format of a TCONT frame according to an embodiment of the present invention.

As shown in FIG. 3, the format of the TCONT frame includes three parts: a frame header, a channel overhead, and payload data. The frame header includes a payload length, an extension field, and header check. The channel overhead includes channel ID, BIP check, and monitoring field. The monitoring field further includes a REI (Remote Error Indication, remote error indication), a RDI (Remote Defect Indication, remote defect indication), and a DBR. The payload data area is used to bear the E-GEM frame and is formed of multiple E-GEM frames.

Figure 4:
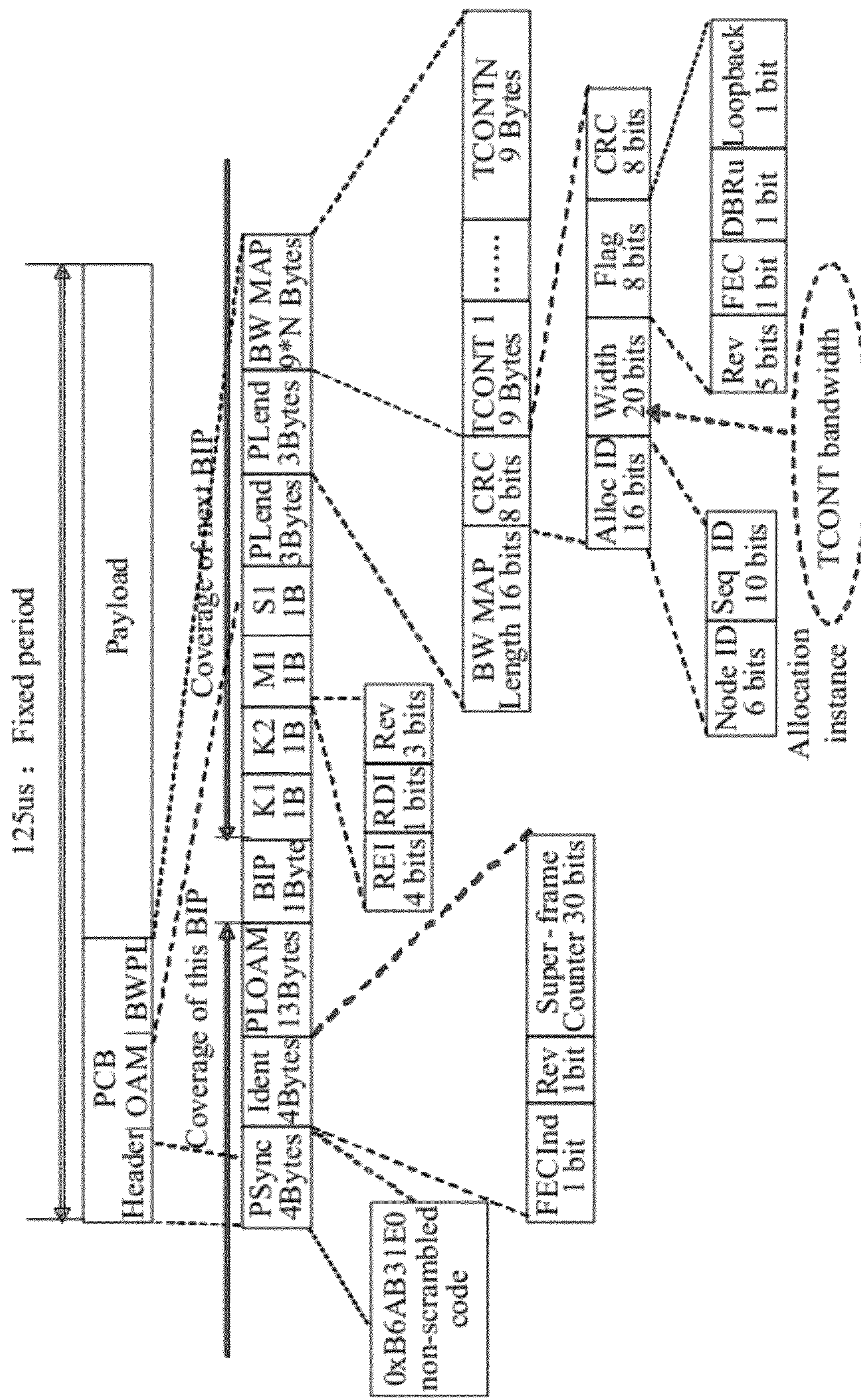
FIG. 4 is a schematic diagram of a structure of a GTH frame according to an embodiment of the present invention.

FIG. 4 illustrates a structure of a GTH frame according to an embodiment of the present invention. The GTH frame includes a PCB (Physical Control Block, physical control block) area and a payload area. The payload area bears a TC frame. The PCB area includes a header, an OAM, and a BWPL (BWMAP PLend, bandwidth map payload length field). The header includes a non-scrambled PSync (Physical Synchronization, physical synchronization) field of 4 bytes and having the content of 0xB6AB31E0. The OAM (Operation, Administration and Maintenance, operation, administration and maintenance) includes: Ident (super-frame indication field), PLOAM (Physical Layer OAM, physical layer operation, administration and maintenance), bit interleaved parity BIP (Bit Interleaved Parity) check, and switching protocol bytes K1, K2, M1, and S1. The Ident includes a FECind (Forward Error Correction, forward error correction) indication, a Rev (reserved) field of the GTH frame, and a super-frame counter Super-frame. The M1 includes an REI, an RDI, and an Rev (Reversed, reversed field). The BWPL includes two identical Plend (Payload Length, payload length) fields and a BWMAP bandwidth map) field. The PLend includes a bandwidth information length BWMAP length and CRC check on the length. The BWMAP includes the bandwidth information of N TCONTs, that is, the bandwidth information of TCONT1 to TCONTN. The bandwidth information of each TCONT includes an Alloc ID (Allocation Identifier, allocation identifier), TCONT bandwidth Width, Flag, and CRC (Cyclic Redundancy Code, cyclic redundancy code) check on the TCONT bandwidth information. The Alloc ID includes a Node ID (node identifier) and a Seq ID (Sequence ID, sequence identifier). The Flag includes a Rev (reversed field), forward error correction FEC of the TCONT bandwidth information, DBRu, and a loopback flag Loopback.

In the embodiment of the present invention, the service data is encapsulated with a header and an address identity according to the format shown in FIG. 2, and an E-GEM frame is obtained; the E-GEM frame is used as a data part, and is encapsulated with a header and a channel overhead according to the format shown in FIG. 3, and a TCONT frame is obtained; the TCONT frame is used as a data part, and is encapsulated with a PCB according to the format shown in FIG. 4, and a GTH frame is obtained.

Figure 5:
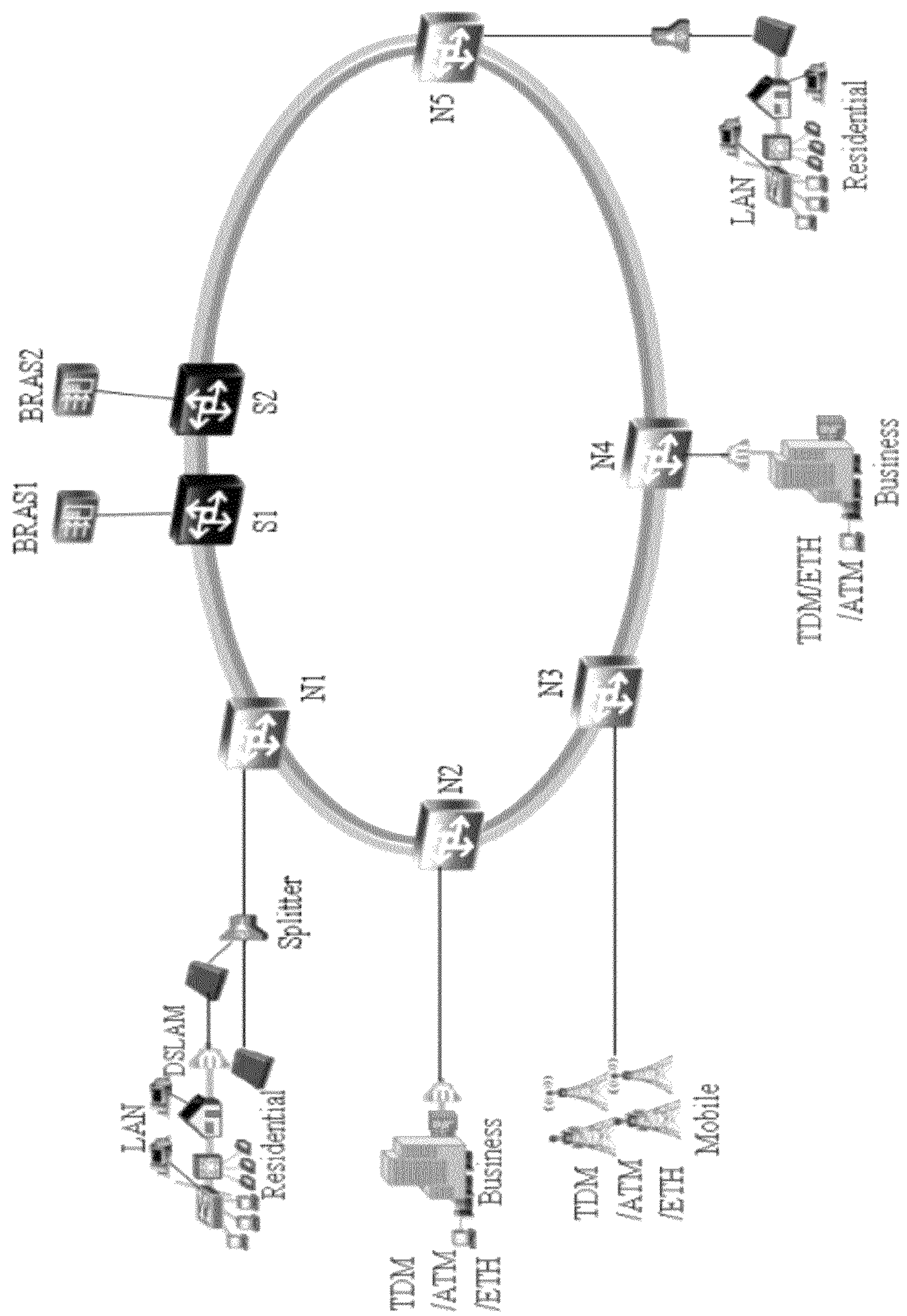
FIG. 5 is a schematic diagram of a typical application scenario of a technical solution according to an embodiment of the present invention.

FIG. 5 illustrates a typical application scenario of a technical solution according to an embodiment of the present invention. The ring network includes a master node (S node) and an N node, for example, S1 and S2, and N1 N2, N3, N4 and N5. Any node on the ring network may directly add and drop various services. The S node may be connected to a BRAS (Broadband Remote Access Server, broadband remote access server), and the N node may be connected to different areas and networks and can transmit various services.

Figure 6:
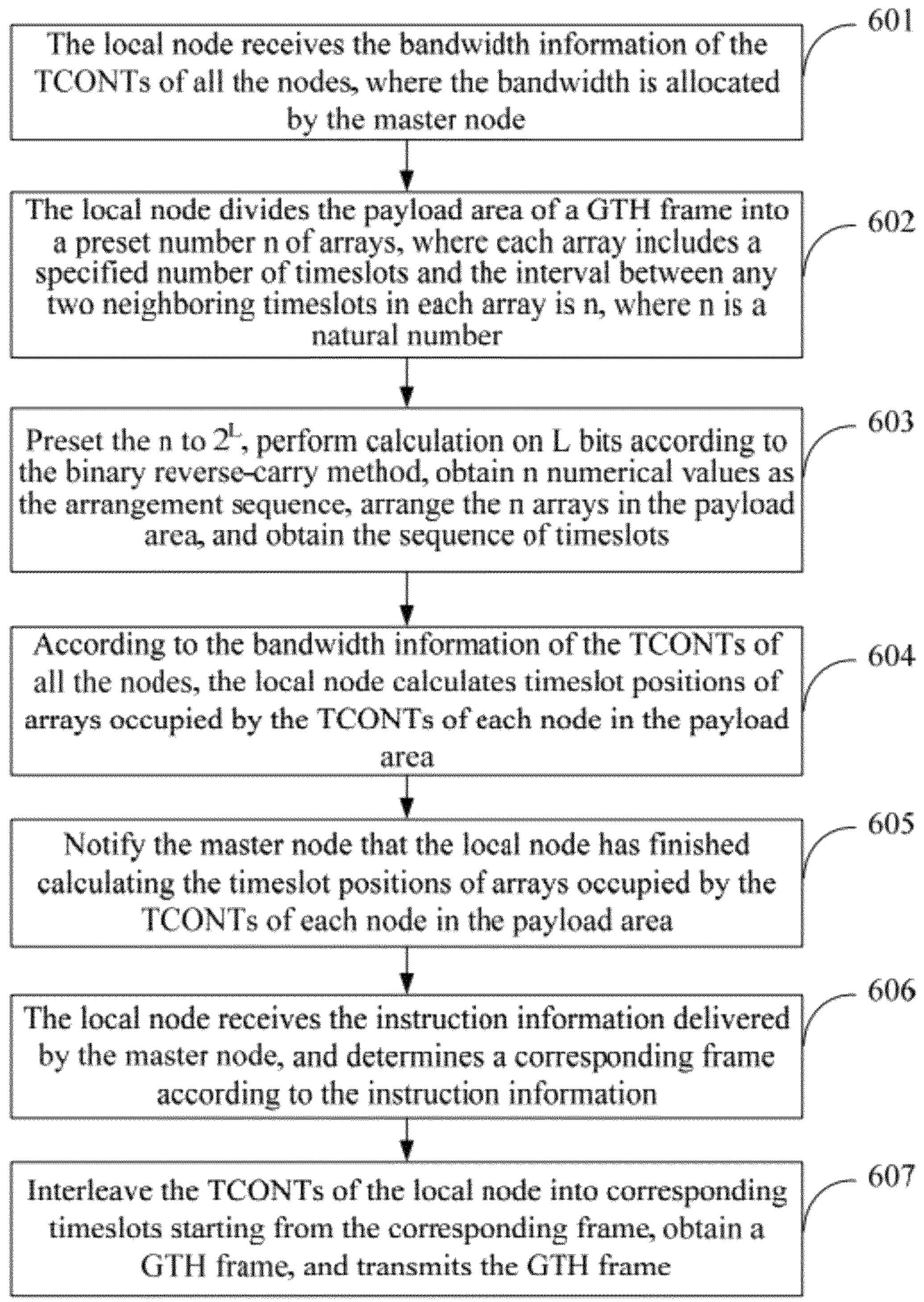
FIG. 6 is a flowchart of a method for transmitting multiple services according to an embodiment of the present invention.

As shown in FIG. 6, an embodiment of the present invention provides a method for transmitting multiple services, where the method includes the following steps:

601: The local node receives the bandwidth information of the TCONTs of all the nodes, where the bandwidth is allocated by the master node.

The local node in this embodiment refers to any N node on the network. Generally, each N node on the network may periodically report DBR information to the master node, where the DBR information includes the service type of the local node and desired bandwidth information. After receiving the DBR information reported by each node, the master node may allocate the bandwidth of the TCONTs to each node by using a DBA algorithm at the transmission side according to the resource and the service type, and deliver information about the allocated bandwidth of the TCONTs to each node. In this embodiment, the bandwidth of the TCONTs is allocated to each node by the master node according to the DBR information reported by each node on the network. In other embodiments, the bandwidth of the TCONTs may be allocated to each node by an independent bandwidth allocating apparatus, or the bandwidth of the TCONTs may be allocated to each node by a BRAS capable of allocating and managing bandwidth on the whole network.

602: The local node divides the payload area of a GTH frame into a preset number n of arrays, where each array includes a specified number of timeslots and the interval between any two neighboring timeslots in each array is n, where n is a natural number.

In the embodiment of the present invention, the number n of arrays is preset, and the payload area is divided into n arrays on each, node. The node includes the master node and the N node.

The number of timeslots included in each array may be set according to the actual need. The number of timeslots included in any two arrays may be the same or different. Preferably, n may be set to be smaller than the total length of timeslots in the payload area and greater than the number of services.

Figure 7:
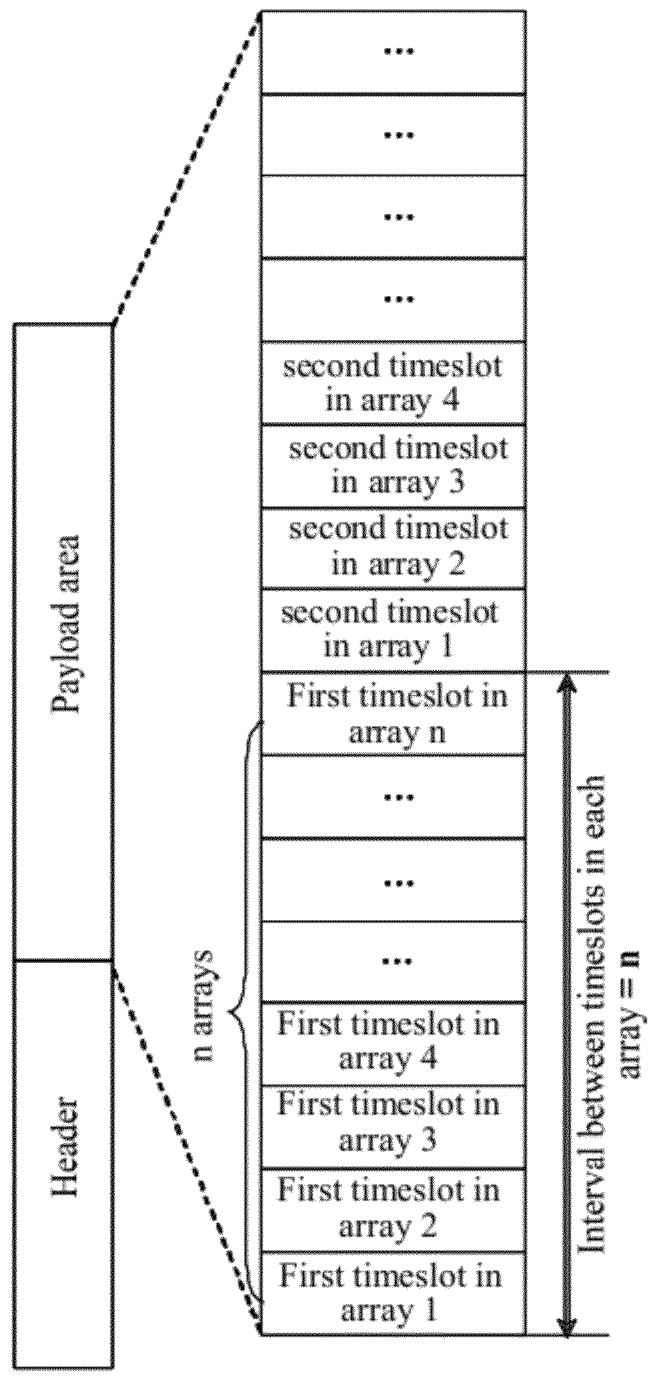
FIG. 7 is a schematic diagram of a process of dividing timeslots in a payload area of a GTH frame according to an embodiment of the present invention.

Preferably, each array includes the same number of timeslots, and the number is an even number. For example, as shown in FIG. 7, the payload area of the GTH frame is divided into n arrays, and each array includes two timeslots. The timeslots in each array are arranged in the following sequence: timeslot 1 and timeslot 2, and the interval between the two timeslots is equal to n timeslots. The n arrays are arranged in the following sequence: array 1, array 2, . . . , array n. In this way, the timeslot sequence shown in FIG. 7 is obtained. The payload area shown in FIG. 7 may be divided into 2*n* timeslots.

Further, after the payload area is divided into n arrays, the process may include: arranging the n arrays in the payload area according to a preset rule, and obtaining a timeslot sequence in the payload area. The process includes the following steps:

603: Preset the n to $2^L$, where L is a natural number and refers to the number of bits when n is represented by a binary number, perform calculation on L bits according to the binary reverse-carry method, obtain n numerical values, use the n numerical values as the arrangement sequence of n arrays, arrange the timeslots corresponding to the n arrays in the payload area according to the arrangement sequence, and obtain the sequence of timeslots in the payload area.

The n numerical values represent the sequence numbers of the arrays, and the sequence of n arrays is arranged according to the n sequence numbers.

Multiple preset rules are available for arranging the timeslots in the embodiment of the present invention. For example, the timeslots corresponding to the n arrays may be arranged in the sequence of natural numbers or in the sequence of Gray code. The specific arrangement sequence is not limited in the present invention. Preferably, the timeslots are arranged by using the binary reverse-carry method according to the following principles:

L bits are arranged in the descending order, and represented by $b_{L-1}$, $b_{L-2}$, . . . , $b_1$, and $b_0$ respectively. The initial value is 0, and then 1 is added to the highest bit $b_{L-1}$, $b_{L-1}$ is carried to $b_{L-2}$ is carried to $b_{L-3}$, . . . , $b_1$ is carried to $b_0$. A higher bit is carried to a lower bit each time, and $2^L$ numerical values, that is, n numerical values, may be obtained. The n numerical values are represented by decimal numbers and used as the arrangement sequence numbers of the n arrays.

The following describes a process of the binary reverse-carry operation by using a specific instance.

For example, the length of the payload area of the GTH frame is equal to 16 timeslots; n is preset to 8, the payload area is divided into 8 arrays, and each array includes two timeslots. Because the value 8 may be represented by three binary bits, that is, L=3, three bits $b_2$, $b_1$, and $b_0$ are arranged in the descending order, a carry from the highest bit to a low bit is generated, and eight binary numbers are obtained in sequence. After these binary numbers are converted into decimal numbers, the decimal numbers are used as the arrangement sequence of eight arrays, as shown in Table 1.

TABLE 1

| $b_2\,b_1\,b_0$ | Decimal Number | Timeslot Position No. | Array Sequence |
|---|---|---|---|
| 0 0 0 | 0 | 1 | Array 1 |
| 1 0 0 | 4 | 5 | Array 2 |
| 0 1 0 | 2 | 3 | Array 3 |
| 1 1 0 | 6 | 7 | Array 4 |
| 0 0 1 | 1 | 2 | Array 5 |
| 1 0 1 | 5 | 6 | Array 6 |
| 0 1 1 | 3 | 4 | Array 7 |
| 1 1 1 | 7 | 8 | Array 8 |

Figure 8:
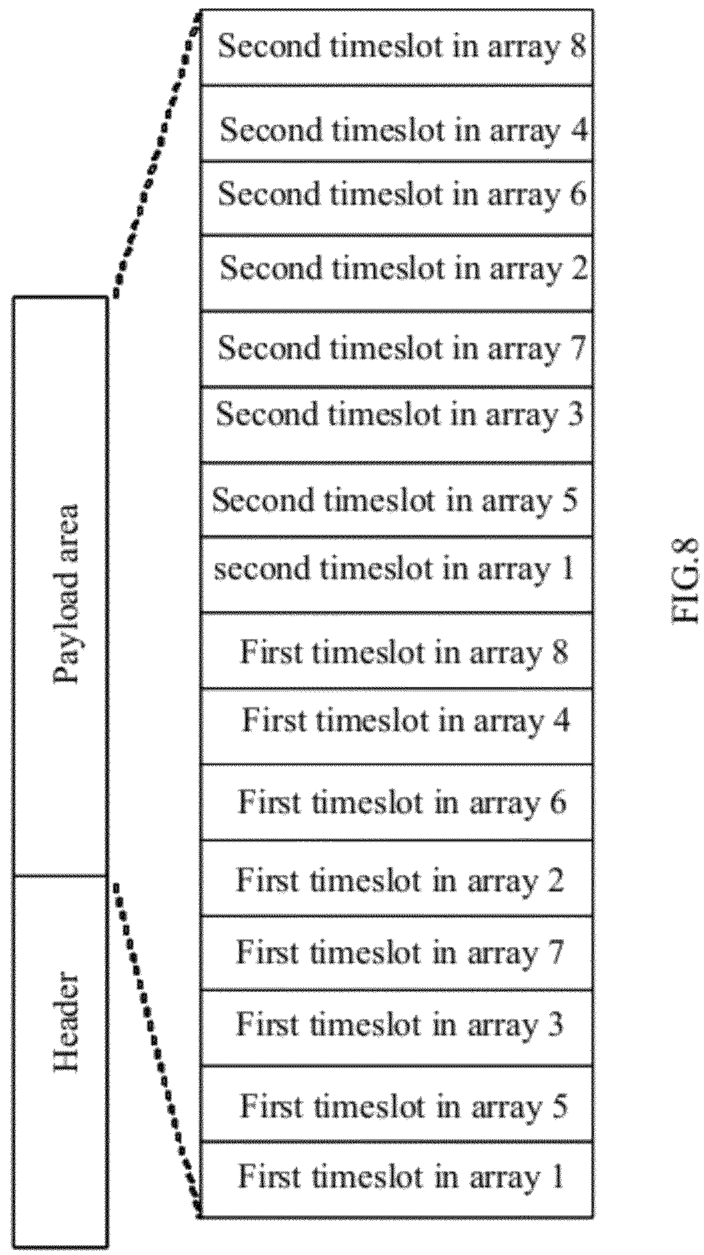
FIG. 8 is a schematic diagram of timeslot positions after a payload area with a length of 16 timeslots is divided according to an embodiment of the present invention.

After a binary reverse-carry operation on the three bits, eight decimal numbers are obtained as follows: 0, 4, 2, 6, 1, 5, 3, and 7, which are used as the sequence numbers of timeslot positions in the eight arrays. The timeslot positions in the payload area are counted from 1 and the total number of timeslots is 16. Therefore, the eight sequence numbers beginning with 0 are converted into sequence numbers beginning with 1, that is, 1 is added to each value, and the timeslot position numbers shown in Table 1 are obtained. The eight arrangement sequence numbers correspond to the first array to the eighth array respectively. Therefore, the arrangement sequence numbers of the eight arrays are obtained as follows: array 1 at the first place, array 2 at the fifth place, array 3 at the third place, array 4 at the seventh place, . . . , array 7 at the fourth place, and array 8 at the eighth place. After the arrangement is completed, the timeslot distribution is shown in FIG. 8. Eight arrays are arranged according to the sequence, and the interval between the first timeslot and the second timeslot within each array is equal to eight timeslots.

604: According to the bandwidth information of the TCONTs of all the nodes, the local node calculates the timeslot positions of arrays occupied by the TCONTs of each node in the payload area.

605: Notify the master node that the local node has finished calculating the timeslot positions of arrays occupied by the TCONTs of each node in the payload area, and further, the result may be stored in the form of a timeslot mapping table.

The local node may send a notification to the master node by sending a preset ID, for example, an FLAG-A, to indicate that the local node has completed the calculation process. Certainly, other manner may also be adopted to notify the master node, and the means are not limited in the embodiment of the present invention.

Accordingly, after receiving the notification from each node, the master node may deliver instruction information to each node, where the instruction information is used to instruct each node to generate frames from a specified frame according to the timeslot positions obtained through calculation. Specifically, the instruction information may be in multiple forms, including, but not limited to, ID information and specified frame information. Specific forms of the instruction information are not limited in the embodiment of the present invention.

606: The local node receives the instruction information delivered by the master node, and determines a corresponding frame according to the instruction information.

Specifically, after receiving the instruction information, the local node first updates the local timeslot mapping table, and determines a corresponding frame. This frame is used by the local node to decide when to perform interleaving and multiplexing according to the updated mapping table. That is, interleaving and multiplexing is performed from this frame according to the updated timeslot mapping table, and before this frame, interleaving and multiplexing is performed according to the current timeslot mapping table before this frame.

Generally, the local node may store two mapping tables: current mapping table Cur and next timeslot mapping table Next. Initially, the Cur refers to the overhead timeslot mapping table, and the Next is empty. After the local node completes the calculation in step 705, the local node stores the obtained timeslot mapping table in the Next. In this case, the local node still performs interleaving and multiplexing according to the Cur; after receiving the instruction from the master node, the local node updates the Cur according to the table in the Next, and then performs interleaving and multiplexing by using the table in the Cur, that is, the mapping table obtained in step 705. When the local node calculates a new timeslot mapping table once again, the local node still stores the new timeslot mapping table in the Next, replaces the original table in the Next with the new timeslot mapping table, and waits to perform update next time when receiving a new instruction from the master node.

607: According to the timeslot positions of the arrays occupied by the TCONTs of the local node in the payload area, the local node interleaves the TCONTs of the local node into corresponding timeslots starting from the frame, obtains a GTH frame, and transmits the GTH frame.

The process of interleaving the TCONTs into the timeslots in the payload area by the local node may be as follows:

Starting from the first TCONT of all the TCONTs of the local node, all the timeslots in array 1 of the n arrays are allocated to the first TCONT by using the timeslot mapping table; if the timeslots of array 1 are allocated completely, the timeslots in array 2 and array 3 are allocated successively until timeslots are allocated to the first TCONT completely. Then, timeslots are allocated to the second TCONT; if there are remaining timeslots in array 1 after timeslots are allocated to the first TCONT completely, the remaining timeslots in array 1 are allocated to the second TCONT. The process continues in the same way, that is, timeslots starting from a timeslot next to those allocated to the previous TCONT are allocated to each TCONT until timeslots are allocated to all the TCONTs completely.

Figure 9:
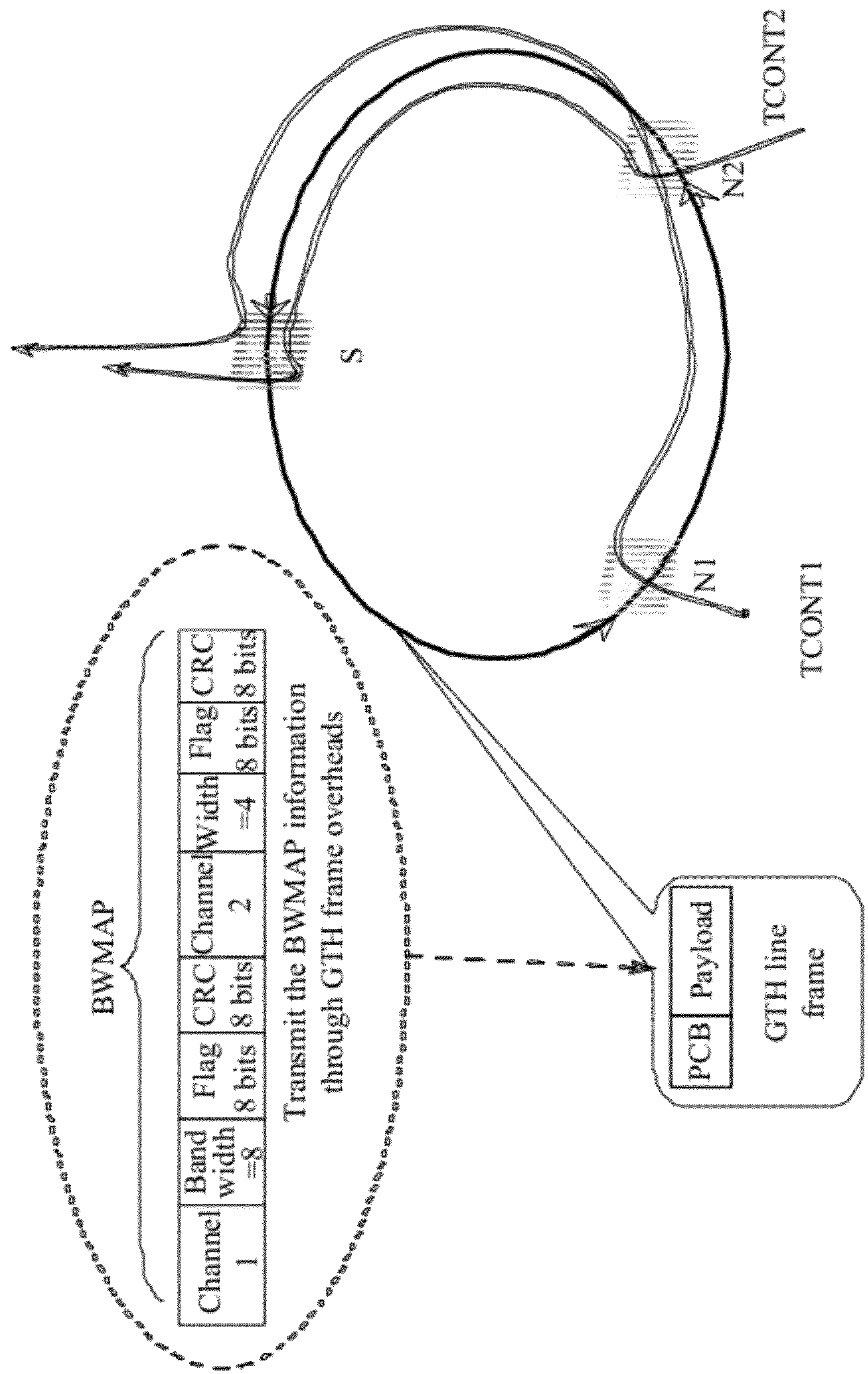
FIG. 9 is a schematic diagram of a specific application scenario where multiple services are transmitted according to an embodiment of the present invention.
Figure 10:
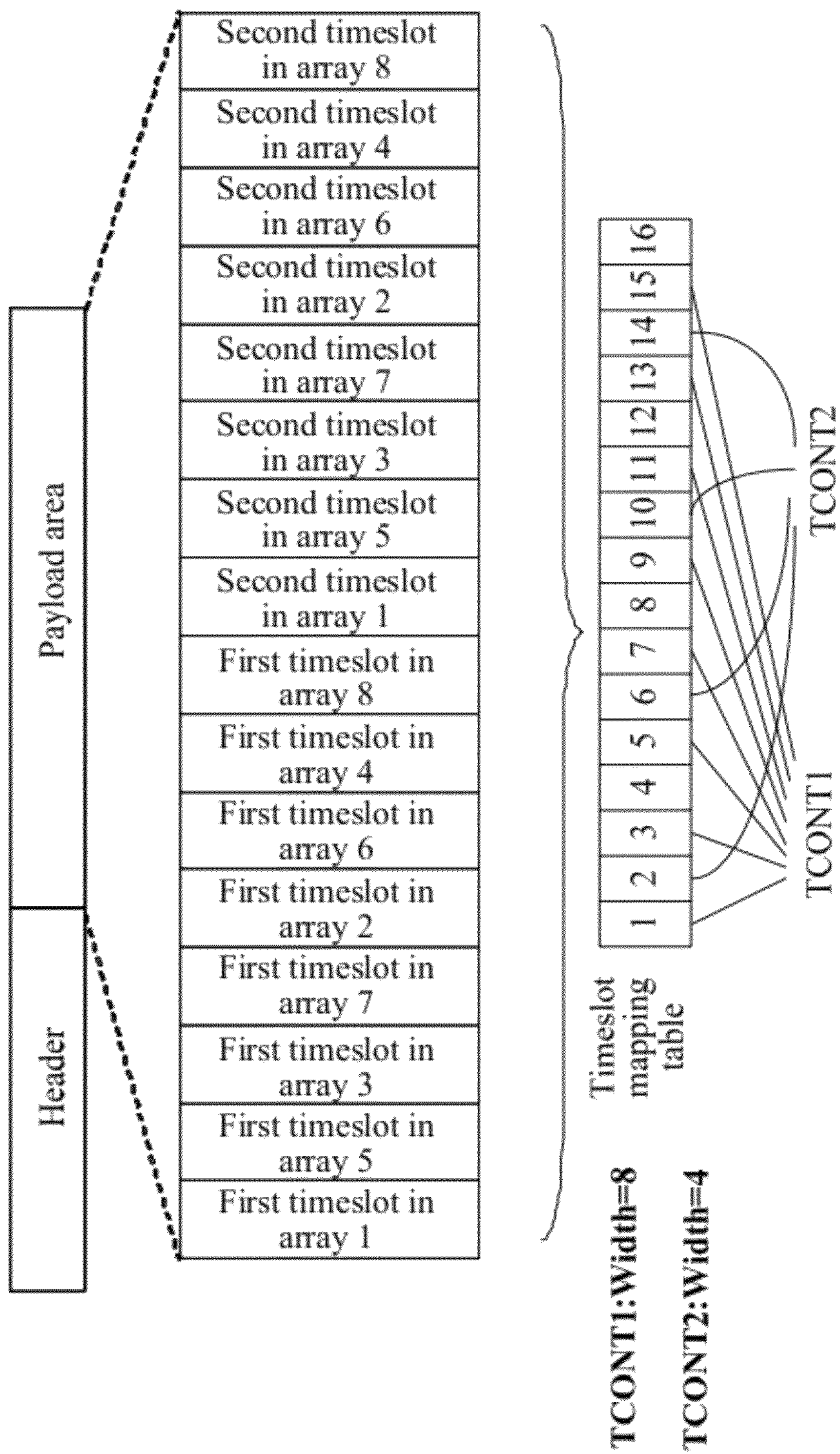
FIG. 10 is a schematic diagram of a mapping table obtained by each node in the application scenario shown in FIG. 9.
Figure 11:
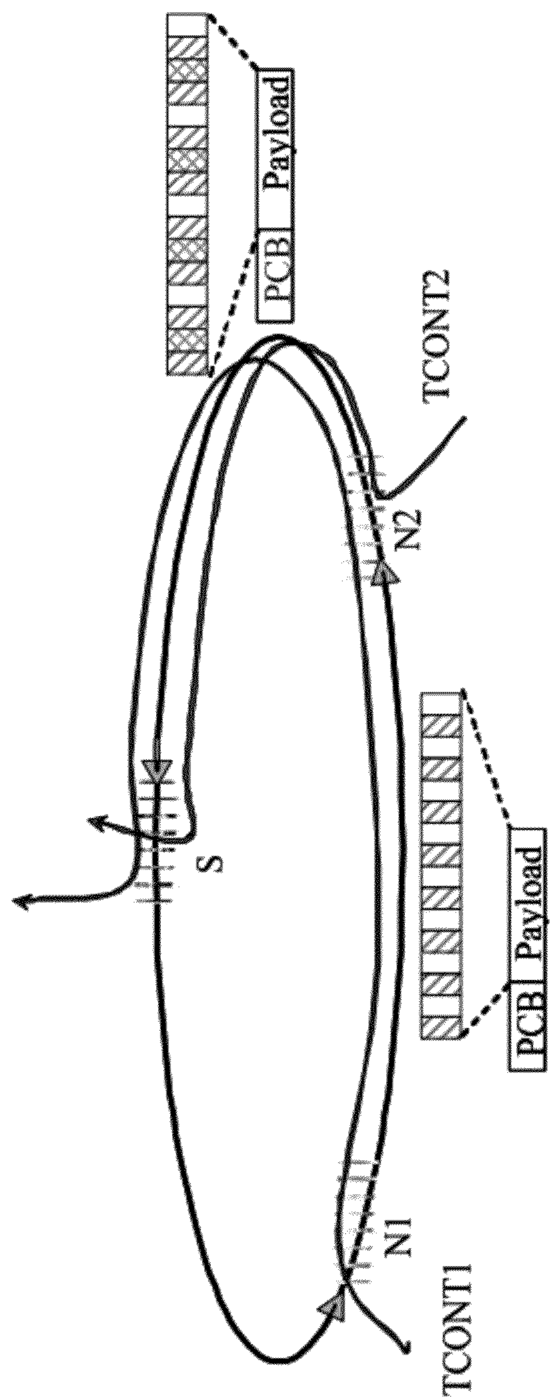
FIG. 11 is a schematic diagram of a service transmission timeslot after a $(K+1)^{th}$ frame in the application scenario shown in FIG. 9.

Based on the application scenario shown in FIG. 9, the following describes a process of transmitting multiple services. One master node S node and two N nodes N1 and N2 are available on the ring network. The N1 node has a service TCONT1, and the N2 node has a service TCONT2, and the N1 node and the N2 report the DBR to the S node respectively. According to the DBR information of each TCONT, the S node calculates a bandwidth map by using the DEA algorithm at the transmission side, and obtains that the width of the TCONT1 is equal to 8, that is, eight timeslots; and the width of the TCONT2 is equal to 4, that is, four timeslots. Then, the S node sends the bandwidth map to the two nodes through a GTH frame. The S node and the nodes Ni and N2 calculate the timeslot positions of the TCONTs of each node in the payload area by using a preset DEA algorithm, and obtain and store a timeslot mapping table respectively. The timeslot mapping tables obtained by all the nodes are the same. The preset DBA algorithm refers to the binary reverse-carry method in this embodiment. Assuming the length of the line payload area is equal to 16 timeslots and is divided into eight arrays, and each array includes two timeslots, each node obtains a timeslot position sequence shown in FIG. 8. Each node determines the positions of its TCONTs in the timeslot sequence according to the bandwidth of its own TCONTs. If the bandwidth of the TCONT1 of the N1 node is equal to 8, the TCONT1 occupies eight timeslots. In the payload area, the TCONT1 occupies the following timeslots: the first timeslot in array 1, the first timeslot in array 3, the first timeslot in array 2, the first timeslot in array 4, the second timeslot in array 1, the second timeslot in array 3, the second timeslot in array 2, and the second timeslot in array 4. If the bandwidth of the TCONT2 of the N2 node is equal to 4, the TCONT2 occupies four timeslots. In the payload area, the TCONT2 occupies the following timeslots: the first timeslot in array 5, the first timeslot in array 6, the second timeslot in array 5, and the second timeslot in array 6. In this way, the timeslot mapping table shown in FIG. 10 may be obtained. After the timeslot mapping table is obtained, the N1 and N2 report the FLAG-A flag to the S node; after receiving the FLAG-A flag, the S node delivers a Tu flag at the $K^{th}$ frame, to instruct the nodes N1 and N2 to perform framing at a next frame, that is, the $(K+1)^{th}$ frame, according to the timeslot mapping table. After receiving the Tu flag, the N1 and N2 send and receive the TCONT1 and the TCONT2 respectively at the next frame, that is, the $(K+1)^{th}$ frame, according to the timeslot mapping table stored on the N1 and N2 respectively. The format of the GTH frame starting from the $(K+1)^{th}$ frame on the loop is shown in FIG. 11. According to the direction of the loop, the N1 node interleaves the TCONT1, and the obtained timeslot sequence is shown at the lower part in FIG. 11, where the diagonal-shadowed timeslots are occupied by the TCONT1. Then, the N2 node interleaves the TCONT2 on the basis of the timeslot sequence, and the obtained timeslot sequence is shown at the upper part in FIG. 11, where the cross-shadowed timeslots are occupied by the TCONT2. Finally, these timeslots are transmitted to the S node. In this way, transmission of multiple services is implemented.

In this embodiment, preferably, the number n of arrays may be preset to $2^{(K-L)}$, where $2^L$ refers to the number of timeslots occupied by the minimum adjustable bandwidth of the service bandwidth and $2^K$ refers to the number of timeslots occupied by the length of the payload area. In this case, it can be guaranteed that the output services are interleaved optimally.

By using the method for transmitting multiple services according to the embodiment of the present invention, timeslots are allocated evenly, so that asynchronous adaptation of multiple services can be implemented. In addition, bandwidth for different types of services is strictly assured, service bandwidth can be adjusted flexibly, and the complexity of logic implementation is reduced. Compared with the prior art, the method interleaves and multiplexes services by timeslots instead of using the block TCONT structure, thereby greatly shortening the delay occurring when a node sends services to a working channel and a protection channel respectively, reducing the cache, and avoiding failure of the dual-transmission process. When lines of different rates are multiplexed, the cache and delay needed for mapping services from low-rate lines to high-rate lines can be reduced. Furthermore, FB services can also be properly interleaved and multiplexed, and bandwidth fragments left after some FB services are deleted are fully utilized, thereby increasing the bandwidth utilization of the lines.

Figure 12:
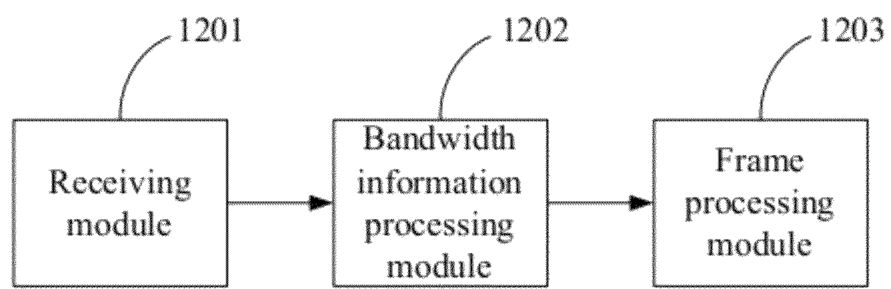
FIG. 12 is a schematic diagram of a structure of an apparatus for transmitting multiple services according to an embodiment of the present invention.

As shown in FIG. 12, this embodiment provides an apparatus for transmitting multiple services, where the apparatus includes:

a receiving module 1201, configured to receive bandwidth information of TCONTs of all nodes;

a bandwidth information processing module 1202, configured to: divide the payload area of a GTH frame into a preset number n of arrays, where each array includes a specified number of timeslots and the interval between any two neighboring timeslots in each array is n, where n is a natural number, and calculate, according to the bandwidth information of the TCONTs of all the nodes, timeslot positions of the arrays occupied by the TCONTs of each node in the payload area; and a frame processing module 1203, configured to: interleave, according to the timeslot positions of the arrays occupied by the TCONTs of a local node in the payload area, the TCONTs of the local node into corresponding timeslots starting from a specified frame, obtain a GTH frame, and transmit the GTH frame.

The number n of arrays is equal to $2^{(K-L)}$, where $2^L$ refers to the number of timeslots occupied by the minimum adjustable bandwidth of the service bandwidth, and $2^K$ refers to the number of timeslots occupied by the length of the payload area.

The bandwidth information processing module 1202 is further configured to: before calculating the timeslot positions of the TCONTs of each node in the payload area, arrange the timeslots corresponding to n arrays in the payload area according to a preset rule, and obtain a timeslot sequence in the payload area.

In this embodiment, the process of arranging n arrays in the payload area according to the preset rule and obtaining the timeslot sequence in the payload area by the bandwidth information processing module includes:

presetting the number n to $2^L$, where L is a natural number and refers to the number of occupied bits when n is represented by a binary number;

performing calculation on L bits according to a binary reverse-carry method, obtaining n numerical values, and using the n numerical values as the arrangement sequence of n arrays; and arranging the n arrays in the payload area according to the arrangement sequence, and obtaining a timeslot sequence in the payload area.

In this embodiment, the frame processing module 1203 includes:

an instruction information obtaining unit, configured to: notify the master node that the local node has finished calculating the timeslot positions of the TCONTs of each node in the payload area, and receive instruction information sent from the master node; and a frame processing unit, configured to: interleave, according to the instruction information obtained by the instruction information obtaining unit and the timeslot positions of the arrays occupied by the TCONTs of the local node in the payload area, the TCONTs of the local node into corresponding timeslots starting from a corresponding frame, obtain a GTH frame, and transmit the GTH frame.

Figure 13:
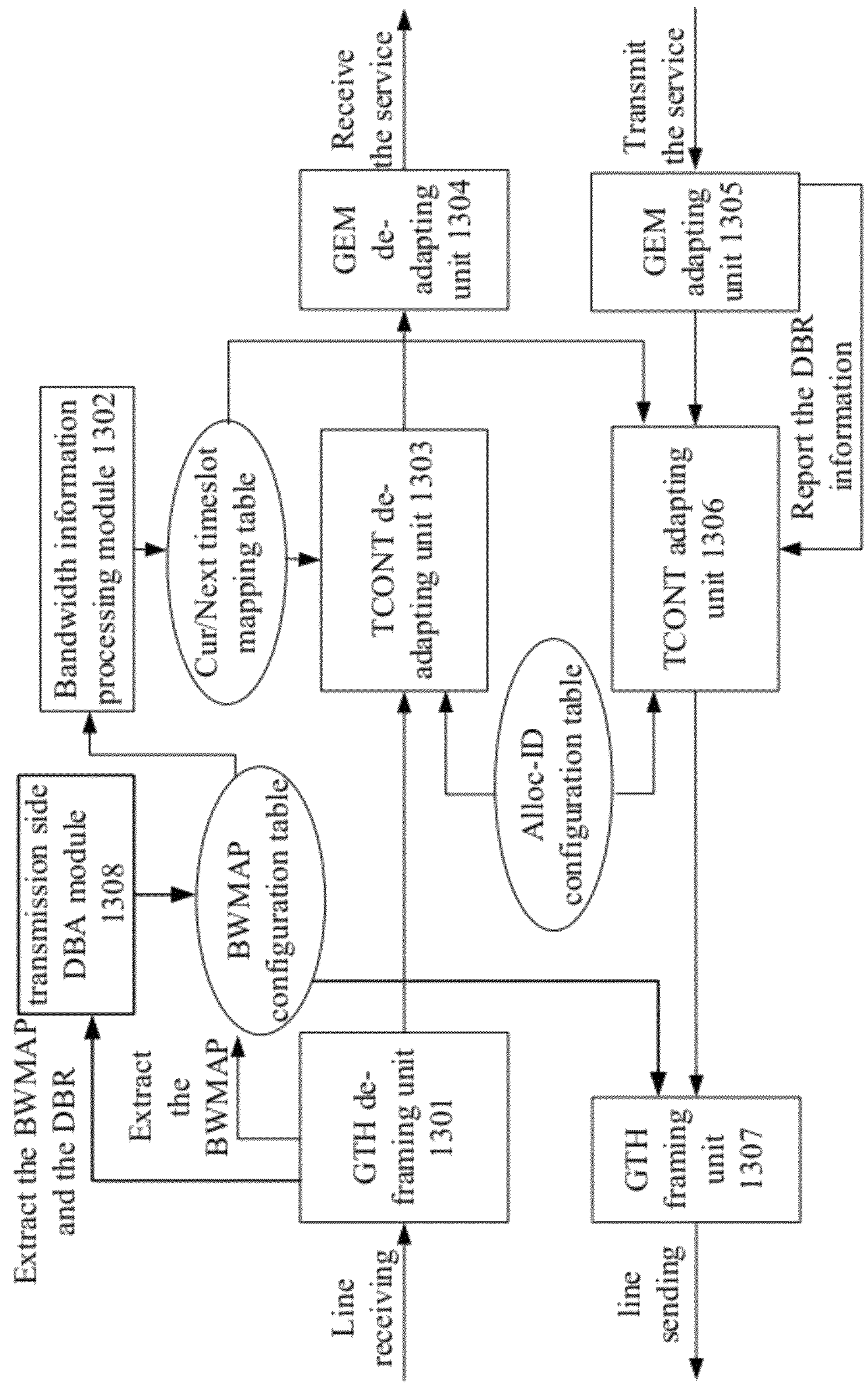
FIG. 13 is a schematic diagram of a specific implementation of an apparatus for transmitting multiple services according to an embodiment of the present invention.

The apparatus provided in this embodiment may be integrated on any node, including the N node and S node, on the network. FIG. 13 is a schematic diagram of the specific implementation of the apparatus. As shown in FIG. 13, the apparatus includes a GTH de-framing unit 1301, a bandwidth information processing module 1302, a TCONT de-adapting unit 1303, a GEM de-adapting unit 1304, a GEM adapting unit 1305, a TCONT adapting unit 1306, a GTH framing unit 1307, and a transmission side DBA module 1308. The GEM adapting unit 1305, the TCONT adapting unit 1306, and the GTH framing unit 1307 are mainly used in a service transmission process. The GTH de-framing unit 1301, the TCONT de-adapting unit 1303, and the GEM de-adapting unit 1304 are mainly used in a service receiving process. The bandwidth information processing module 1302 is the same as the bandwidth information processing module 1202 and is configured to generate a current Cur timeslot mapping table and a next Next timeslot mapping table. When the apparatus is an N node apparatus, the apparatus includes the GTH de-framing unit 1301, the bandwidth information processing module 1302, the TCONT de-adapting unit 1303, the GEM de-adapting unit 1304, the GEM adapting unit 1305, the TCONT adapting unit 1306, and the GTH framing unit 1307. When the apparatus is a master node apparatus, in addition to 1301 to 1307, the apparatus further includes a transmission side DEA module 1308, configured to: extract the BWMAP and DBR information from the received frame, calculate the bandwidth of all the TCONTs on the network, obtain a BWMAP configuration table, and deliver the BWMAP configuration table to each node on the network through the GTH framing unit 1307.

When the apparatus shown in FIG. 13 is used as the N node, the service receiving process is as follows. The GTH de-framing unit 1301 extracts overheads from the line, obtains the BWMAP information, and configures the BWMAP into the BWMAP configuration table. According to the bandwidth information of all the TCONTs in the BWMAP configuration table, the bandwidth information processing module 1302 calculates the timeslot positions of the arrays occupied by all the TCONTs in the payload area by using the method provided in the embodiment of the present invention, stores the calculation result in the form of a timeslot mapping table, and obtains a Next timeslot mapping table. The Cur timeslot mapping table refers to the timeslot mapping table that is currently used. If the N node obtains an instruction from the master node, the N node updates the Next mapping table to the Cur mapping table. The TCONT de-adapting unit 1303 extracts data from corresponding timeslots in sequence according to the timeslot positions of the received TCONTs in the Cur timeslot mapping table and the IDs of the received TCONTs in the Alloc-ID configuration table, and then sends the data to the GEM de-adapting unit 1304 for restoring the service data. Then, the service receiving process ends. When the apparatus is used as the master node, the service receiving process is different from the preceding process in that: in addition to the preceding process, the GTH de-framing unit 1301 extracts the DBR information, and sends the DBR information to the transmission side DBA module 1308; the DBA module 1308 calculates the bandwidth of all the TCONTs, configures the bandwidth information of all the TCONTs into the BWMAP configuration table, and delivers the bandwidth information of all the TCONTs in the BWMAP configuration table to each node on the network through the GTH framing unit 1307. In addition, after extracting the BWMAP from the lines, the GTH de-framing unit 1301 compares the BWMAP with the generated BWMAP configuration table, so as to perform checking.

No matter whether the apparatus shown in FIG. 13 is used as the N node or the master node, the service transmission process is as follows: The service is encapsulated and rate-adapted by the GEM adapting unit 1305, and then sent to the TCONT adapting unit 1306; the length of the service cache queue of the GEM adapting unit 1305 is monitored and obtained in the process; the demand bandwidth information DBR of an equivalent transmission service is calculated, and reported to the TCONT adapting unit 1306. The TCONT adapting unit 1306 interleaves the DBR information into the TCONT overhead according to the IDs of the TCONTs configured in the Alloc-ID configuration table, and then interleaves borne services into corresponding timeslots in sequence according to the timeslot positions of the TCONTs in the Cur timeslot mapping table, and sends the services to the GTH framing unit 1307; after the GTH framing unit 1307 receives the services, it adds the GTH overhead to generate a GTH frame, and sends the GTH frame to the line. Then, the service transmission process ends. When the N node reports the DBR information to the master node, the N node may send the DBR information to the master node in the form of TCONT overheads in out-of-band mode.

By using the apparatus for transmitting multiple services according to the embodiment of the present invention, timeslots are allocated evenly, so that asynchronous adaptation of multiple services can be implemented. In addition, bandwidth for different types of services is strictly assured, service bandwidth can be adjusted flexibly, and the complexity of logic implementation is reduced. Compared with the prior art, the apparatus interleaves and multiplexes services by timeslots instead of using the block TCONT structure, thereby greatly shortening the delay occurring when a node sends services to the working channel and protection channel respectively, reducing the cache, and avoiding failure of the dual-transmission process. When lines of different rates are multiplexed, the cache and delay needed for mapping services from low-rate lines to high-rate lines can be reduced. Furthermore, FE services can also be properly interleaved and multiplexed, and bandwidth fragments left after some FB services are deleted are fully utilized, thereby increasing the bandwidth utilization of the lines.

In addition, it should be noted that the TCONT involved in embodiments of the present invention is not limited to the service related data and may also include the overheads of the GTH frame. Specifically, the overheads of the GTH frame may be considered as a type of TCONTs, and then are interleaved and multiplexed according to the technical solutions. That is, the TCONTs of a node include both the TCONTs of the service and the TCONTs of the overheads, and the TCONTs of the service and the TCONTs of the overheads are interleaved and multiplexed in a unified manner. In this way, multiplexing and transmission of multiple services can be better implemented, and the efficiency of transmission of multiple services is improved.

All or part of the technical solutions provided in the embodiments of the present invention may be implemented by hardware instructed by a program. The program may be stored in a readable storage medium, and the storage medium includes ROM, RAM, a magnetic disk, an optical disk or other media that can store program codes.

The descriptions are merely exemplary embodiments of the present invention, but not intended to limit the present invention. Any modifications, equivalent replacements, and improvements made to the invention without departing from the spirit and principle of the invention shall fall within the scope of the present invention.

What is claimed is:

1. A method method comprising: receiving bandwidth information of transmission containers TCONTs of all nodes; dividing a payload area of a generic transport hierarchy GTH frame into a preset number (n) of arrays, wherein each array comprises a specified number of timeslots and an interval between any two neighboring timeslots in each array is n, and n is a natural number; calculating, according to the bandwidth information of the TCONTs of all the nodes, timeslot positions in arrays occupied by the TCONTs of each node in the payload area; and interleaving, according to the timeslot positions in arrays occupied by the TCONTs of a local node in the payload area, the TCONTs of the local node into corresponding timeslots starting from a specified frame, obtaining a GTH frame, and transmitting the GTH frame.

2. The method according to claim 1, wherein the number n of arrays is equal to $2^{(K-L)}$, wherein $2^L$ refers to the number of timeslots occupied by minimum adjustable bandwidth of service bandwidth, and $2^K$ refers to the number of timeslots occupied by the length of the payload area.

3. The method according to claim 1, wherein, before calculating, according to the bandwidth information of the TCONTs of all the nodes, timeslot positions in arrays occupied by the TCONTs of each node in the payload area, the method further comprises:

arranging n arrays in the payload area according to a preset rule, and obtaining a timeslot sequence in the payload area.

4. The method according to claim 3, wherein the arranging n arrays in the payload area according to the preset rule and obtaining the timeslot sequence in the payload area comprises:

presetting the number n to $2^L$, wherein L is a natural number and refers to the number of occupied bits when the number n is represented by a binary number;

performing calculation on L bits according to a binary reverse-carry method, obtaining n numerical values, and using the n numerical values as the arrangement sequence of n arrays; and arranging the n arrays in the payload area according to the arrangement sequence, and obtaining the timeslot sequence in the payload area.

5. The method according to claim 1, wherein, the interleaving, according to the timeslot positions in arrays occupied by the TCONTs of a local node in the payload area, the TCONTs of the local node into corresponding timeslots starting from a specified frame, obtaining a GTH frame, and transmitting the GTH frame, comprises:

notifying a master node that the local node has finished calculating the timeslot positions of the TCONTs of each node in the payload area, and receiving instruction information sent from the master node; and interleaving, according to the instruction information and the timeslot positions of arrays occupied by the TCONTs of the local node in the payload area, the TCONTs of the local node into corresponding timeslots, obtaining the GTH frame, and transmitting the GTH frame.

6. An apparatus comprising: a receiving module, configured to receive bandwidth information of transmission containers TCONTs of all nodes; a bandwidth information processing module, configured to: divide a payload area of a generic transport hierarchy GTH into a preset number n of arrays, wherein each array comprises a specified number of timeslots and an interval between any two neighboring timeslots in each array is n, wherein n is a natural number, and calculate, according to the bandwidth information of the TCONTs of all the nodes, timeslot positions of arrays occupied by the TCONTs of each node in the payload area; and a frame processing module, configured to:

interleave, according to the timeslot positions of arrays occupied by the TCONTs of a local node in the payload area, the TCONTs of the local node into corresponding timeslots starting from a specified frame, obtain a GTH frame, and transmit the GTH frame.

7. The apparatus according to claim 6, wherein the number n of arrays is equal to $2^{(K-L)}$, wherein $2^L$ refers to the number of timeslots occupied by minimum adjustable bandwidth of service bandwidth, and $2^K$ refers to the number of timeslots occupied by the length of the payload area.

8. The apparatus according to claim 6, wherein the bandwidth information processing module is further configured to: before calculating the timeslot positions of the arrays occupied by the TCONTs of each node in the payload area, arrange n arrays in the payload area according to a preset rule, and obtain a timeslot sequence in the payload area.

9. The apparatus according to claim 8, wherein the arranging n arrays in the payload area according to the preset rule and obtaining the timeslot sequence in the payload area by the bandwidth information processing module comprises:

presetting the number n to $2^L$, wherein L is a natural number and refers to the number of occupied bits when n is represented by a binary number;

performing calculation on L bits according to a binary reverse-carry method, obtaining n numerical values, and using the n numerical values as the arrangement sequence of n arrays; and arranging the n arrays in the payload area according to the arrangement sequence, and obtaining the timeslot sequence in the payload area.

10. The apparatus according to claim 6, wherein the frame processing module comprises:

an instruction information obtaining unit, configured to: notify a master node that the local node has finished calculating the timeslot positions of the TCONTs of each node in the payload area, and receive instruction information sent from the master node; and a frame processing unit, configured to: interleave, according to the instruction information obtained by the instruction information obtaining unit and the timeslot positions of the arrays occupied by the TCONTs of the local node in the payload area, the TCONTs of the local node into corresponding timeslots, obtain the GTH frame, and transmit the GTH frame.

* * * * *